Jan. 30, 1945.　　　　J. M. GRANT　　　　2,368,415
DRILL PIPE PROTECTOR
Filed May 14, 1941
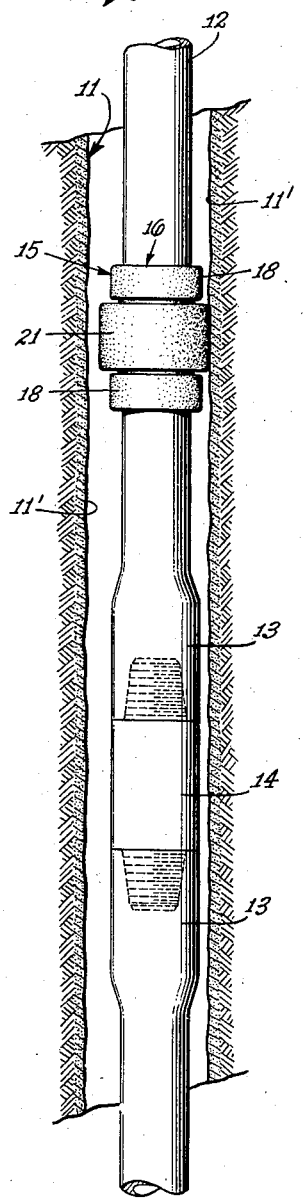
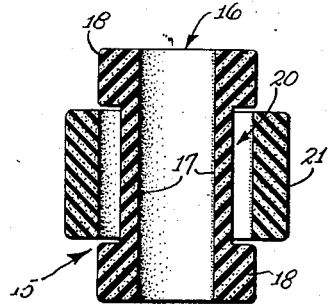
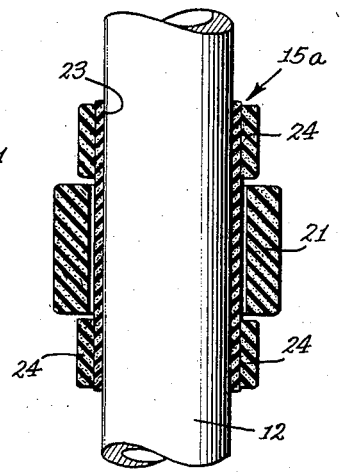
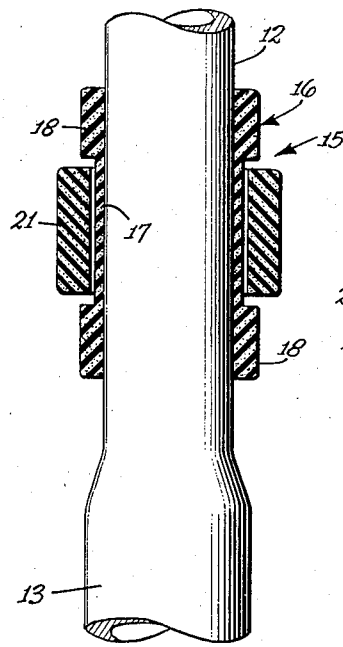
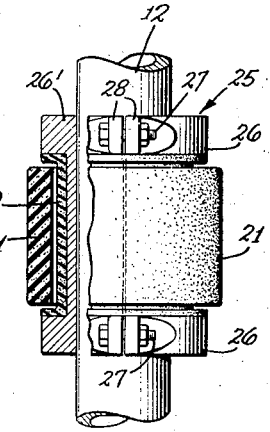
JOHN M. GRANT,
INVENTOR
ATTORNEY.

Patented Jan. 30, 1945

2,368,415

UNITED STATES PATENT OFFICE 2,368,415

DRILL PIPE PROTECTOR

John M. Grant, South Pasadena, Calif.

Application May 14, 1941, Serial No. 393,335

8 Claims. (Cl. 308—4)

This invention relates generally to drill pipe protectors used in the drilling of oil wells and the like.

Various types of protectors have been developed for use in protecting the well casing and the drill pipe, the most common and successful of which comprise merely an annular rubber collar which is stretched on to the pipe. The ordinary types of protectors are designed particularly for use on the portion of the drill pipe operating within the part of the well which has been cased. Although it has long been desirable to provide a protector for use on drill pipes in that portion of the hole beyond the casing to protect both the drill pipe and the walls of the hole, the ordinary types of protectors are not suitable for this purpose because they soon wear out and because they tend to break down the colloidal mud wall of the uncased part of the hole which has been built up by the circulation of the colloidal rotary mud. So far as I know, there has been no protector produced which is satisfactory for use in the uncased part of the well. As a result the drill pipe has a tendency to gyrate and whip during rotation thereby greatly increasing the necessary torque required to operate the drill. The gyrating pipe also in many instances breaks down the colloidal mud wall of the well permitting intrusion of water and often resulting in cave-ins of the well. A drill pipe of course wears excessively where it contacts the walls of the well. To reduce this wear on the pipe operators have even gone so far as to increase the diameter of the double ended pin used in tool joints where the pipe is provided with a box at each end so that the outer surface of the pin will extend beyond the remainder of the pipe and bear against the sides of the hole before any other part of the pipe. This practice is not successful for the reason that the metal pin soon wears.

It is therefore a primary object of this invention to provide means for stabilizing the drill pipe in the uncased part of the well which will serve as a means for protecting both the pipe and the mud wall of the well. In this connection it is a particular object to provide a protector means particularly designed to resist abrasion and to permit free turning of the pipe without having any portion of the pipe or protector in rotative contact with the wall of the well. It is also an object to provide protector means for the pipe which will reduce the torque necessary for rotating the pipe in the well.

It is a further object to provide a drill pipe protector means embodying a resilient member adapted to firmly engage the pipe which may be mounted on the pipe in the same manner as an ordinary protector by the various types of apparatus which have been developed for mounting elastic protectors on pipe.

These and other objects will be apparent from the drawing and the following description thereof. Referring to the drawing which is for illustrative purposes only—

Fig. 1 is a sectional elevation of a part of a well showing a drill pipe with a protector means embodying the invention mounted thereon;

Fig. 2 is a sectional elevation of a protector means embodying the invention before the same has been mounted on a drill pipe;

Fig. 3 is a sectional elevation of the device of Fig. 2 shown mounted on a drill pipe;

Fig. 4 is a sectional elevation of a modified form of the invention shown on a pipe; and Fig. 5 is an elevation of another form of protector means broken away to show parts thereof in section.

More particularly describing the invention, reference numeral 11 generally indicates the uncased part of a well being drilled. The wall of the well hole is shown lined with a layer of colloidal mud 11' such as is built up upon the sides of the hole through the circulation of a suitable mud during the drilling process. The purpose of this wall or cake is to seal off the various strata pierced by the hole and thereby prevent water intrusion and possible cave-ins. Maintenance of this wall is therefore important as is well recognized. Suspended in the portion of the well hole shown is a drill pipe 12 composed of a plurality of sections having boxes 13 at their ends adapted to accommodate a double ended pin 14 to make up a tool joint. The protector means of this invention has been shown mounted on a section of the pipe. This protector means, generally indicated by reference numeral 15, is shown engaging one side of the hole holding the pipe in spaced relation thereto thereby preventing any possibility of either the pipe or the wall becoming worn or broken respectively.

Referring to Figs. 2 and 3 for a more detailed description of the protector means 15, such means comprises a spool 16 formed of a resilient and elastic material preferably rubber. This spool includes a relatively thin walled annular section 17 which terminates at each end in the flanges 18. These portions of the spool cooperate to form an annular collar receiving groove or depression 20. Loosely mounted surrounding the spool and within the groove or depression 20 is a resilient annular protector member 21 which is also preferably formed of rubber. In this connection it may be pointed out that it may be desirable to make the parts of some other material than rubber provided the material has the necessary resilient characteristics to permit the mounting of the spool on the pipe and to insure long life of the parts under the adverse conditions in which they are used.

It is contemplated that the spool be made with a bore considerably smaller than the outer diameter of the pipe to which it is to be applied so that it is necessary to radially expand the spool in order to mount it on the pipe and that when so mounted the material of the spool will be under tension and will thereby firmly grip the pipe forming an anchor of fixed support on the pipe for the collar. In this connection the spool is adapted for installation by several of the various types of apparatus which have been developed for expanding and applying the ordinary annular rubber drill pipe protectors to pipe.

Before the spool is expanded the flanges 18 preferably extend out sufficiently far to just prevent the protector collar 21 from slipping off the spool unless distorted. When the spool is expanded and mounted on the drill pipe in the stretched condition, it is naturally elongated and the walls considerably reduced in thickness as is apparent from a comparison of Fig. 3 where the spool is shown on the pipe, with Fig. 2 where the spool is unexpanded. After the spool has been stretched on to the pipe the protector collar itself is made sufficiently thick so that it will project radially beyond the tool joint of the pipe and when used on the pipe in the well as shown in Fig. 1 it will contact the wall of the well and hold the remainder of the pipe in spaced relation therefrom. In this connection the collar should be of less overall diameter than the diameter of the hole being drilled in order that the ordinary circulation of the rotary drilling fluid may take place upwardly in the well exteriorly of the drill pipe.

By referring to Fig. 1 it will be apparent that when the protector collar 21 contacts the wall of the well that it will remain stationary and permit the rotation of the pipe and spool therein. In consequence of this there is little if any tendency for the protector collar, which is the only part of the drill pipe engaging the sides of the hole, to dig into the mud lining of the well and damage it. Since both the spool 16 and protector collar 21 are formed of a resilient material such as rubber, very little wear takes place between the engaging surfaces of these members which are lubricated by the liquid of the flowing mud stream. The resilient nature of the parts of the protector means enables them to resist abrasion from contact with the walls of the well and the solids contained in the flowing mud stream.

In Fig. 4 there is shown another form of the invention in which the protector means here indicated as 15a comprises an elongate relatively thin inner sleeve 23 which is mounted on the pipe in stretched condition to firmly engage the same. A protector collar 21, such as heretofore described is loosely mounted on the sleeve 23. The protector collar is held in place by means of a pair of annular elastic rings 24 which are expanded on to the member 23 and being in tension will firmly engage the sleeve 23. This protector means operates in the same manner as that heretofore described.

In Fig. 5 there is shown a somewhat modified form of the invention wherein an inner metal spool 25 consisting of two half sections 26 and 26' are secured about the pipe 12 by means of the bolts 27 cooperating with lugs 28. The metal spool 25 is provided with a rubber insert sleeve 29 adapted to form a bearing surface for a protector collar 21 loosely mounted thereabout. This form of the invention also operates in the same general manner as the protector means of Figs. 2 and 3.

In the description it has been suggested that the protector means should preferably be formed of rubber. In this connection it is contemplated that the rubber used for this purpose should be relatively solid and firm although being both expansible and resilient such as the rubber utilized in the present day annular drill pipe protectors.

Although this invention is primarily designed for use in combination with that part of the drill pipe extending beyond the cased part of the hole and operating in the formation it may also be desirable to employ the protector means of this invention on that portion of the pipe within the well casing where the dimensions of the parts are such as to allow for the flow of mud past the protector means.

As is well known in the art it is necessary and customary to drill ahead of the part of the well which has been lined with casing and it has been customary to provide drill pipe and casing protectors consisting of a single annular fixed collar of rubber on that portion of the drill pipe operating within the casing. As a part of this invention it is contemplated to use the combination of the ordinary fixed rubber protectors on that portion of a drill pipe operating within the well casing and to use a rotatable type protector means such as described herein on the portion of the pipe operating in the formation below the well casing.

Although the invention has been particularly shown and described it is contemplated that various modifications and changes can be made without departing from the scope of the invention and it is intended to cover such changes as come within the claims.

I claim as my invention:

1. A drill pipe protector comprising a spool formed of resilient material adapted to be mounted in expanded condition on the pipe, and a resilient collar of sufficient size to be loosely rotatable on said spool after the spool has been expanded and mounted on a pipe.

2. A drill pipe protector comprising a rubber spool having a smaller bore than the outer diameter of the pipe to which it is to be applied, said spool having a relatively thin annular wall portion terminating at each end in an external flange, and a rubber collar loosely mounted around the relatively thin annular wall portion of the spool and adapted to be retained thereon by said flanges, said collar having a bore of sufficient diameter to permit the collar to remain loose upon said spool after the spool has been expanded on to a drill pipe.

3. In combination, a drill pipe having tool joint sections projecting radially beyond the main sections of the pipe, a rubber spool radially expanded and under tension mounted on the pipe between the tool joint sections thereof, and a rubber collar loosely mounted on said spool for relative rotative movement, said collar projecting radially beyond the tool joint sections of said pipe.

4. In combination, a drill pipe, a relatively thin walled resilient sleeve radially expanded and under tension on said pipe, a relatively thicker walled resilient collar freely positioned on said sleeve, said collar being shorter than said sleeve, and a pair of resilient retaining rings mounted on said sleeve under tension on opposite sides of said collar.

5. In combination a drill pipe, means adapted to be mounted on the pipe to form a spool, a resilient collar loosely mounted on said spool, said spool having resilient surfaces where it is engageable with the collar.

6. In combination a drill pipe, a split metal spool having means for securely attaching the spool to a drill pipe, a relatively thin walled rubber sleeve surrounding said spool, and a rubber collar surrounding said sleeve and freely rotatable thereon.

7. In a drill pipe protector, the combination of: a first hollow cylindrical one-piece body adapted to be immovably secured upon a drill pipe in concentric relationship thereto; an annular flange integrally formed on said body at each end thereof providing a median neck on said body of an outside diameter smaller than that of said flanges; and a second hollow cylindrical body of rubber or like material having an inside diameter smaller than the outside diameter of said flanges and an outside diameter at least equal to that of said flanges and rotatably and concentrically mounted on said neck.

8. In a drill pipe protector, the combination of: a first one-piece hollow cylindrical body of rubber or like resiliently compressible material adapted to be expanded and shrunk on a drill pipe of an outside diameter larger than the bore of said body and thereby stationarily mounted thereon, said body having radially enlarged ends providing a median neck on said body; and a second hollow cylindrical body of rubber or like resiliently compressible material of an outside diameter greater than that of said enlarged ends and an inside diameter smaller than that of said enlarged ends, said second hollow cylindrical body being rotatably and concentrically mounted on said neck.

JOHN M. GRANT.